United States Patent
Jang et al.

(10) Patent No.: US 6,668,894 B2
(45) Date of Patent: Dec. 30, 2003

(54) FILM LAYER SEPARATION DEVICE FOR MULTI-LAYER DISKS

(75) Inventors: Chau-Shin Jang, Hsinchu Hsien (TW);
Li-Te Kuo, Hsinchu Hsien (TW);
Rong-Chang Ma, Hsinchu Hsien (TW);
Yu-Hsiu Chang, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/038,823

(22) Filed: Jan. 8, 2002

(65) Prior Publication Data
US 2003/0102381 A1 Jun. 5, 2003

(30) Foreign Application Priority Data
Nov. 30, 2001 (TW) .................... 90129614 A

(51) Int. Cl.⁷ .................... B30B 9/00; B32B 31/20; B28B 17/00; B29C 43/00; B23Q 3/15
(52) U.S. Cl. .................... 156/540; 156/580; 156/379.7; 156/379.8; 425/3; 425/90; 264/106; 264/496; 269/52; 269/900; 118/121; 118/379.7
(58) Field of Search .................... 235/493; 425/3, 425/810, 90, 150, 174.4; 264/106, 107, 108.3, 109, 496, 338, 406; 118/101, 102, 121; 269/641, 48, 52, 56, 216, 900, 91; 427/164, 271; 156/230, 231, 242, 540, 580, 379.7, 379.8

(56) References Cited

U.S. PATENT DOCUMENTS 4,907,956 A  *  3/1990  Ezaki et al. ................. 425/110

FOREIGN PATENT DOCUMENTS

JP           02-118931     *   5/1990    ............ G11B/7/26

* cited by examiner

Primary Examiner—J. A. Lorengo
(74) Attorney, Agent, or Firm—Birch, Stewart, Kolasch & Birch, LLP

(57) ABSTRACT

A film layer separation device for multilayer disks is disclosed. With the help of a stamper made of magnetic materials, the film layer separation is achieved through the attractive force imposed on the stamper by electromagnetic tearing. The device contains at least: a stamper supporter for supporting the stamper, an electromagnetic attraction device, and a base fixture. To distribute the electromagnetic force on the stamper evenly, the electromagnetic attraction device can have an array of homogeneously disposed electromagnetic iron cores and a conductive coil that can generate a magnetic force. Thus, there will be no localized stress when tearing.

7 Claims, 4 Drawing Sheets

FILM LAYER SEPARATION DEVICE FOR MULTI-LAYER DISKS

BACKGROUND OF THE INVENTION

1. Field of Invention

The invention relates to a disk film layer separation device and, in particular, to a film layer separation device for multilayer disks.

2. Related Art

In disk manufacturing techniques, a common trend is to make disks with larger memory capacities. There are several methods to enlarge the disk capacity. For example, one can decrease the gap between tracks or, alternatively, add more layers onto the disk to increase the memory block area on a disk.

Taking optical disks as an example, they are often made into single-sided but with two or even more layers. The way to make a single-sided double-layer optical disk is as follows. First, a stamper already printed with data is coated with a layer of glue. After drying, it forms a data film with data bits. Afterwards, paste glue (usually UV glue) is applied thereon to combine with a substrate already printed with data. The combined product is then sent through a UV lamp to harden. Finally, the stamper is separated from the substrate, thereby transferring the data film formed with data on the stamper onto the substrate. Therefore, the substrate forms a single-sided optical disk with two layers of data. The formation of multiple data layers is achieved by repeating the above process several times.

During the above process, the quality of the separation of the stamper from the substrate determines whether the data film can be appropriate transferred to the substrate to form a double-layer disk. In other words, the device that separates the stamper and the substrate plays a very important role in the manufacturing process.

Conventional separation devices use plastic substrates as stampers. After pasting the data film, the stamper is separated using a sucking force produced by vacuum. Such vacuum sucking method employs a vacuum sucker, as shown in FIG. 1. On the top surface 11 of the vacuum sucker 10, there are several annular grooves 12, which generate the vacuum sucking force. As clearly seen from the drawing, only the annular grooves produce the sucking force. The top surface 11 in contact with the stamper does not produce sucking force. Through the sucking force, a strong attractive force tears the stamper off the substrate.

Although the vacuum sucker can achieve a stronger attractive force, the sucking force cannot be homogeneously applied to the stamper because it is produced by the annular grooves. Accordingly, the stress is not continuous throughout the stamper. Such discontinuities at certain places will result in bad separation of the film from the substrate.

SUMMARY OF THE INVENTION

In observation of the foregoing problems in the prior art, the invention provides a film layer separation device for multi-layer disks. In combination with the manufacturing process that uses metal stampers, an electromagnetic film separation base is employed to produce an attractive force on the stamper for performing the separation. Since the magnetic force produced by the electromagnetic iron can be designed to apply homogeneously onto the whole metal stamper, therefore no discontinuous or local stress would occur in tearing. The invention can make the film on the stamper smoothly separated from the substrate. Moreover, the stamper can be recycled for further uses.

Accordingly to the disclosed techniques, the film layer separation device for multi-layer disks includes a stamper supporter, an electromagnetic attraction device, and a base fixture.

The stamper supporter has a supporting plane for fixing the stamper so that the stamper can perform the data transfer job by having accurate face-to-face matching between the data film and the disk. The stamper can have a positioning mechanism in design to fix the position of the stamper. One surface of the stamper is attracted by an electromagnetic iron; the other surface including the data film directly corresponds to the disk.

The electromagnetic attraction device is used in film pasting and tearing process to attract the stamper. It contains several major portions; namely, one or several magnetic iron cores and their surrounding conductive coils, a base, and a magnetic housing. The conductive coils are imposed with currents to produce electromagnetic forces. The magnetic iron cores enhance the electromagnetic forces produced by the conductive coils. The base supports the magnetic iron cores. The magnetic housing covers the conductive coils. The rim of the base is connected with and fixes the magnetic housing.

The base fixture fixes the whole device, including the stamper supporter and the electromagnetic attraction device. It may or may not include a base fixing part and a push part. The base fixing part fixes the whole separation device. The push part directly connect with the electromagnetic attraction device to push the stamper supporter and the electromagnetic attraction device closer to the disk while transferring the data film, and to pull them away from the disk after the data film transfer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 1:
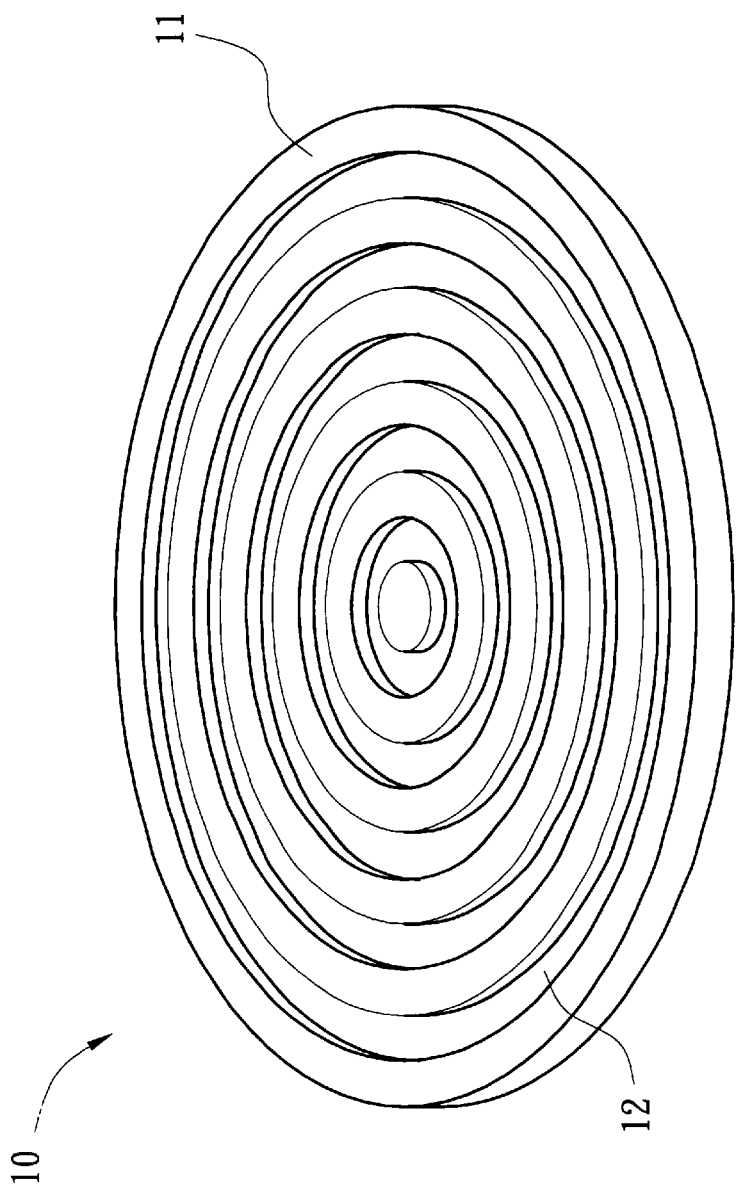
FIG. 1 is a top view of the vacuum sucker.

During the process of making multi-layer disks, both the separation of the stamper from the substrate and transferring the data film on the stamper to the substrate use electromagnetic forces to attract the stamper. The stamper is made of magnetic materials. The homogeneous electromagnetic forces reduce uneven stress distributions that may affect film layer separations. An electromagnetic iron is provided inside the base that attracts the stamper. When separating the film layer, a current is applied to the coil surrounding the electromagnetic iron, producing a magnetic force to hold the stamper on the electromagnetic iron top cover. The stamper is then taken away inward from outside or outward from inside. After the film layer separation, the current imposed on the coil is turned off. The stamper is thus smoothly removed from the stamper and the next manufacturing process follows.

Since the electromagnetic force is homogeneously distributed on the stamper, therefore it can be recycled for further uses.

According to the previous description, through the disclosed separation device the attraction force is evenly applied during the film tearing process without the problem of localized stresses. The separation device has a stamper supporter, an electromagnetic attraction device, and a base fixture.

The stamper supporter includes a supporting plane for fixing the stamper. In such a way, the stamper can accurately put the data film and the disk face to face to make data film transfer. The stamper supporter can have a positioning mechanism to fix the position of the stamper. One surface of the stamper is attracted by the electromagnetic iron, the other surface with the data film directly corresponds to the disk.

The electromagnetic attraction device is connected with the stamper supporter. Since its main objective is to hold the stamper, the magnetic force produced by the electromagnetic attraction device has to be perpendicular to the supporting plane of the stamper supporter. Thus, when the electromagnetic attraction device generates the electromagnetic force, the stamper can be attracted and held steady for pasting and tearing films.

The electromagnetic attraction device contains several major parts: one or several magnetic iron cores and its surrounding conductive coils, a base, and a magnetic housing. The conductive coil is provided with a current to generate an electromagnetic force. The magnetic iron core is to enhance the electromagnetic force produced by the conductive coil. The base supports the magnetic iron cores. The magnetic housing covers the conductive coils. The rim of the base and the magnetic housing are connected and fixed.

The conductive coil can be coiled in the axial direction or in the radial direction. In addition, the magnetic iron core uses a magnetic material with a low magnetic resistance coefficient. The numbers of conductive coils and magnetic iron cores is determined by the desired magnetic force distribution. The conductive coils and magnetic iron cores can be arranged into an array. The main objective is to make the electromagnetic force generated by the electromagnetic attraction device to homogeneously and perpendicularly penetrate through the stamper supporter.

The film pasting and separating tasks have to be achieved using a base fixture. That is, the above two devices are fixed and positioned in the process of getting close to and away from the disk. Therefore, the base fixture has two functions: one is to fix and support the stamper supporter and the electromagnetic attraction device for precise positioning; and the other is to push and draw the stamper supporter and the electromagnetic attraction device so that the two device can approach the disk to paste and tearing films.

The base fixture has a base fixing part and a push part. The base fixing part fixes the whole separation device. The push part is directly connected to the electromagnetic attraction device. When transferring the data film, the stamper supporter and the electromagnetic attraction device are pushed close to the disk by the push part. The push part also draws the stamper supporter and the electromagnetic attraction device away from the disk after transferring the data film.

An embodiment is described hereinafter to explain the above design. The multi-layer disk film separation device 20 in FIG. 2 has four sets of electromagnetic iron cores and coils. It contains an electromagnetic top cover 201, an electromagnetic iron core 202, an electromagnetic housing 203, an electromagnetic bottom plate 204, a protruding ring 205, a supporting post 206, a first bottom plate 207, a film separating base housing 208, a second bottom plate 209, a sliding block 210, a platform 211, a sensor supporting frame 212, and a ventilation fan outlet 213.

In the stamper supporter, the electromagnetic top cover 201 is the supporting plane mentioned before for supporting the stamper. The sensor supporting frame 212 surrounds and fixes the stamper.

Figure 3:
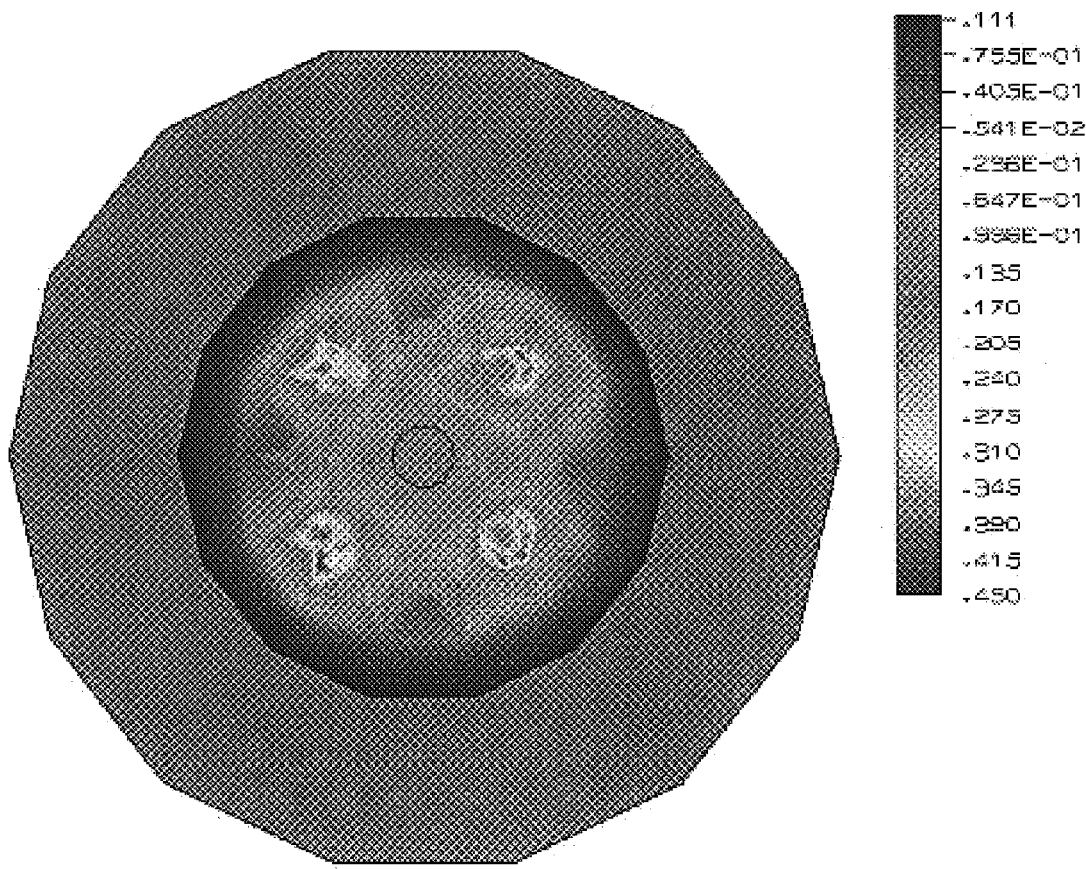
FIG. 3 is a magnetic force distribution of the electromagnetic base in FIG. 2.

In the electromagnetic attraction device design, half of the separation device contains two electromagnetic iron cores 202. The conductive coils are not drawn in the plot. The electromagnetic housing 203 and the electromagnetic bottom plate 204 are also designed according to the above concept. Such a design of four magnetic coils homogeneously distributes the electromagnetic force to the electromagnetic top cover 201, the stamper supporting plane. The magnetic field distribution thus generated is shown in FIG. 3.

Figure 2:
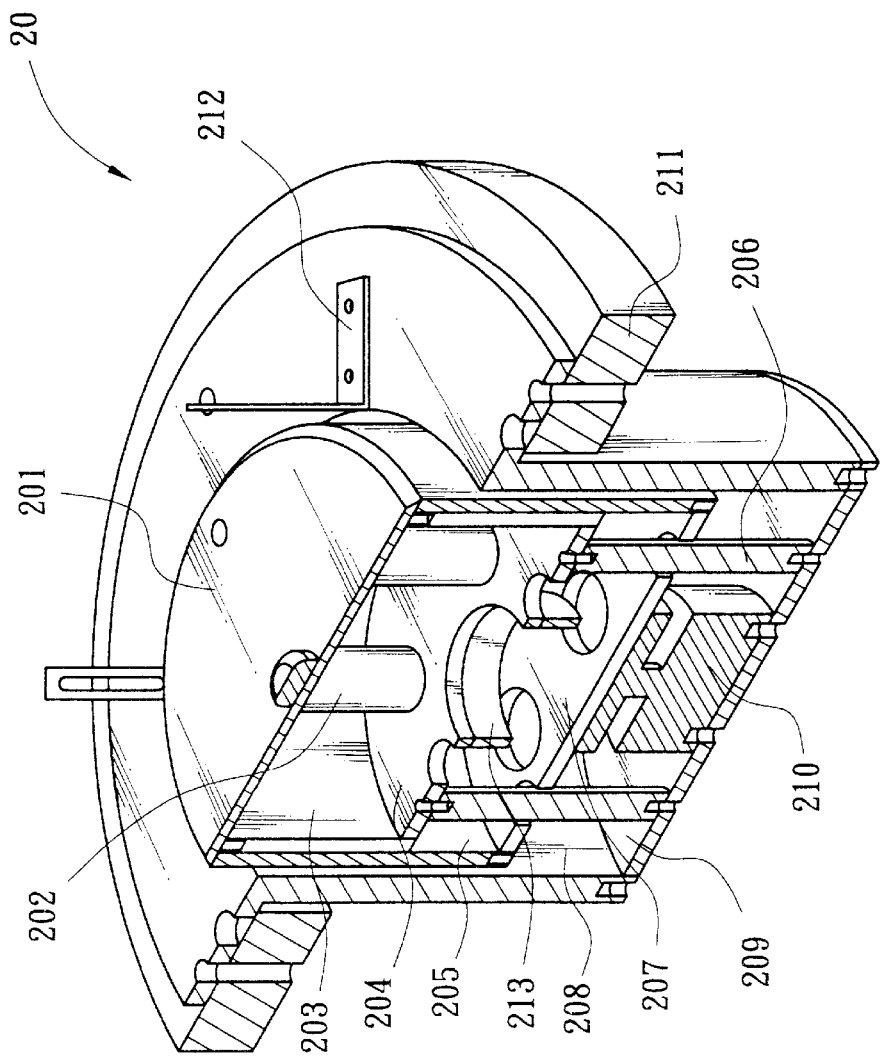
FIG. 2 is an explicit embodiment of the disclosed electromagnetic base.

The rest part of the FIG. 2 is the part contained in the base fixture. It includes the protruding ring 205, the supporting post 206, the first bottom plate 207, the film separating base housing 208, the second bottom plate 209, the sliding block 210, the platform 211, the sensor supporting frame 212, and the ventilation fan outlet 213. The protruding ring 205 encloses the electromagnetic housing 203. The electromagnetic housing 203, i.e. the whole electromagnetic attraction device and the supporting plane of the stamper supporter are pushed out for pasting and tearing films. The ventilation fan outlet 213 accommodates a ventilation fan to lower the work temperature of the device. The first bottom plate 207 supports the protruding ring 205 and the ventilation fan. The sliding block 210 underneath pushes the protruding ring. The pushing power comes from air pressure or oil pressure. The second bottom plate 209 and the supporting post 206 support the electromagnetic iron bottom plate 204 to fix the electromagnetic attraction device. The film separating base housing 208 and the platform 211 are the supporting part of the work platform for pasting and tearing films.

Figure 4A:
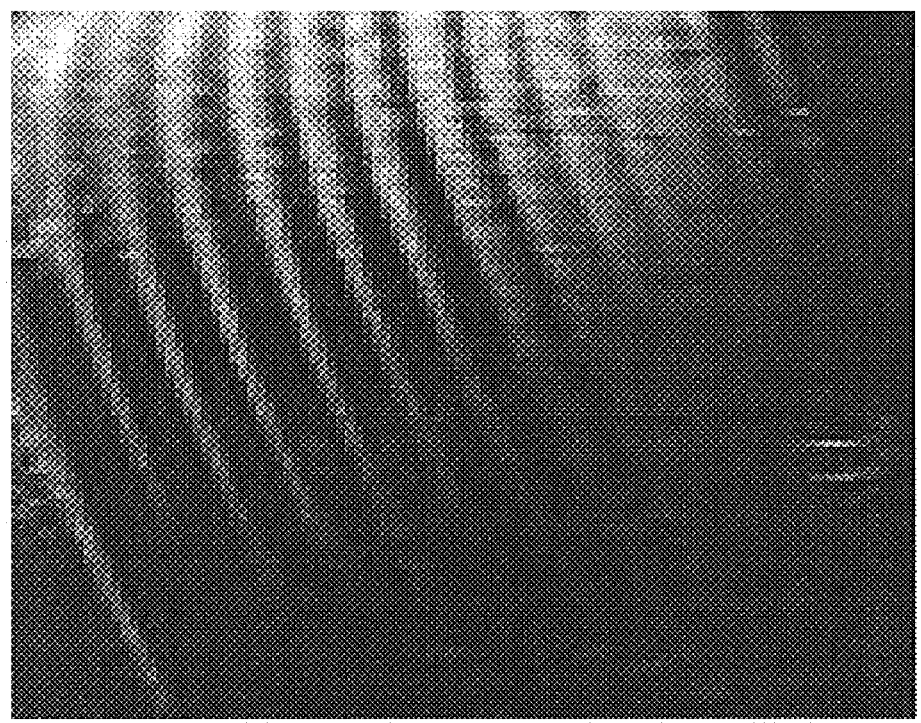
FIG. 4A shows the stress distribution of the vacuum sucker in the prior art.
Figure 4B:
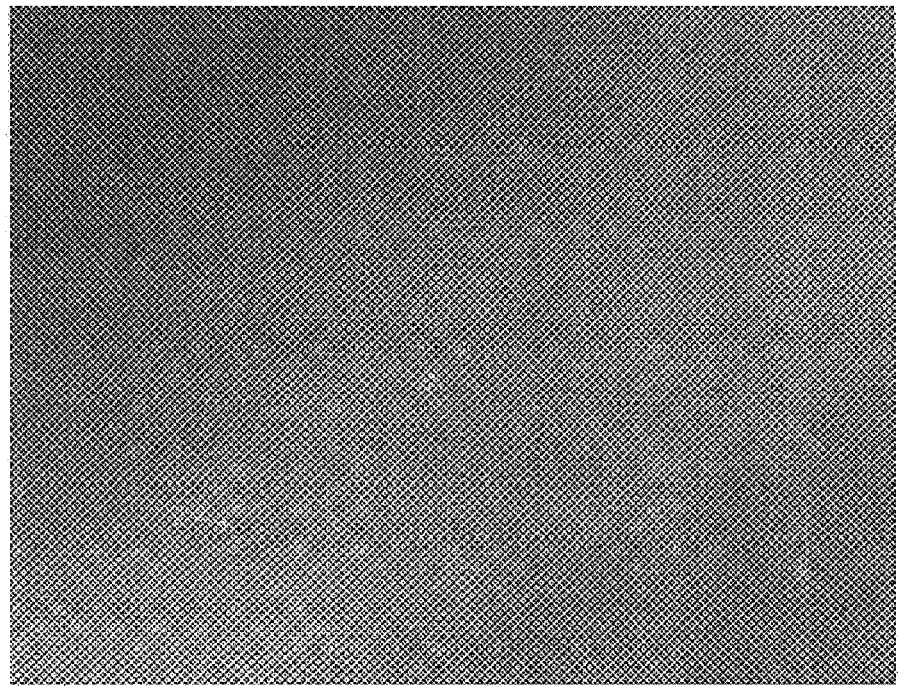
FIG. 4B shows the stress distribution of the second embodiment of the invention.

One should be able to clearly understand the difference between the invention and the prior art from FIGS. 4A and 4B. FIG. 4A shows an unevenly distributed stress, while FIG. 4B has a more homogeneous stress distribution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A film layer separation device for multi-layer disks used in the manufacturing process of making a data disk with a plurality of data layers for holding a magnetic stamper with a data film to separate the stamper from the disk after transferring the data film to the disk, the separation device comprising:

a stamper supporter, which includes a supporting plane for fixing and supporting a top surface of the stamper;

an electromagnetic attraction device, which is connected to the stamped supporter for generating an electromagnetic force perpendicular to the supporting plane to hold the stamper; and a base fixture, which supports the stamper supporter and the electromagnetic attraction device and pushes/draws the stamper supporter and the electromagnetic attraction device close to/away from the disk;

the electromagnetic attraction device comprising:

at lease one conductive coil, which generates an electromagnetic force when an electrical current is imposed;

at least one magnetic iron core, which is surrounded by the conductive coil to enhance the electromagnetic force generated by the conductive coil;

a bottom plate, which supports the magnetic iron core; and a magnetic housing, which covers the conductive coil and is connected to the boundary of the bottom plate and whose top surface supports the stamper supporter.

2. The device of claim 1, wherein the conductive coil is coiled by one of an axial direction coiling and a multi-coil radial direction coiling.

3. The device of claim 1, wherein the magnetic iron core is made of a magnetic material with a low magnetic resistance constant.

4. The device of claim 1, wherein the conductive coils and the magnetic iron cores are arranged in an array according to the stamper supporter area so that the electromagnetic force generated by the electromagnetic attraction device homogeneously penetrates through the stamper supporter in the perpendicular direction.

5. The device of claim 4, wherein the at least one conductive coil includes four conductive coils and at least one magnetic iron core includes magnetic iron cores.

6. The device of claim 1, wherein the base fixture further contains a push part connecting to the electromagnetic attraction device for pushing the stamper supporter and the electromagnetic attraction device close to the disk when transferring the data film and drawing the stamper supporter and the electromagnetic attraction device away from the disk after transferring the data film.

7. The device of claim 6, wherein the push part uses a pushing method using one of air pressure and oil pressure.

* * * * *